United States Patent
Takeda et al.

(10) Patent No.: US 12,291,839 B2
(45) Date of Patent: May 6, 2025

(54) WORK VEHICLE

(71) Applicant: HITACHI CONSTRUCTION MACHINERY CO., LTD., Tokyo (JP)

(72) Inventors: Kazuya Takeda, Abiko (JP); Kazuo Ishida, Ryuugasaki (JP); Shoroku Kawahara, Ushiku (JP)

(73) Assignee: HITACHI CONSTRUCTION MACHINERY CO., LTD., Tokyo (JP)

(*) Notice: Subject to any disclaimer, the term of this patent is extended or adjusted under 35 U.S.C. 154(b) by 205 days.

(21) Appl. No.: 17/638,293

(22) PCT Filed: Mar. 8, 2021

(86) PCT No.: PCT/JP2021/009082
§ 371 (c)(1),
(2) Date: Feb. 25, 2022

(87) PCT Pub. No.: WO2021/192969
PCT Pub. Date: Sep. 30, 2021

(65) Prior Publication Data
US 2022/0333337 A1    Oct. 20, 2022

(30) Foreign Application Priority Data
Mar. 26, 2020    (JP) .................................. 2020-056505

(51) Int. Cl.
*E02F 3/43*    (2006.01)
*E02F 9/20*    (2006.01)
*E02F 9/22*    (2006.01)

(52) U.S. Cl.
CPC .............. *E02F 3/43* (2013.01); *E02F 9/2012* (2013.01); *E02F 9/2285* (2013.01)

(58) Field of Classification Search
CPC . E02F 3/43; E02F 9/2285; E02F 3/432; E02F 9/2228; E02F 9/2282; E02F 9/2012; E02F 9/265; G01C 9/00
See application file for complete search history.

(56) References Cited

U.S. PATENT DOCUMENTS

| | | | | |
|---|---|---|---|---|
| 4,825,568 A | * | 5/1989 | Kawamura | E02F 3/432 414/722 |
| 4,844,685 A | * | 7/1989 | Sagaser | E02F 3/433 91/363 R |

(Continued)

FOREIGN PATENT DOCUMENTS

| | | | |
|---|---|---|---|
| JP | 63226416 A | 9/1988 | |
| JP | 10-54055 A | * 2/1998 | .............. E02F 3/432 |

(Continued)

OTHER PUBLICATIONS

International Search Report of PCT/JP2021/009082 dated May 25, 2021.

*Primary Examiner* — Stephen Holwerda
(74) *Attorney, Agent, or Firm* — MATTINGLY & MALUR, PC (57) ABSTRACT

A wheel loader with a front bucket is capable of preventing spillage of load materials from the bucket, even without adjusting an angle of the bucket where a traveling state is switched from a flat ground to an inclined ground. The wheel loader has a bucket provided on the front of a vehicle body to scoop and discharge a work material, an inclination sensor for detecting an inclination angle θ of the vehicle body, and a controller configured to, in the case where a height position of the bucket is higher than a predetermined height and it is determined that the vehicle body is in a state of being inclined rearward, activate a bucket cylinder for causing the (Continued)

bucket to correct an angle of the bucket toward a front side where the bucket dumps in accordance with the inclination angle of the vehicle body.

5 Claims, 10 Drawing Sheets

(56) References Cited

U.S. PATENT DOCUMENTS

| | | | |
|---|---|---|---|
| 5,784,812 A | 7/1998 | Leidinger et al. | |
| 2007/0135985 A1* | 6/2007 | Berry | E02F 9/2029 |
| | | | 701/50 |
| 2010/0254793 A1 | 10/2010 | Trifunovie | |
| 2014/0039767 A1* | 2/2014 | Jensen | B60K 23/0808 |
| | | | 701/50 |
| 2014/0129093 A1* | 5/2014 | Shirao | E02F 3/433 |
| | | | 701/50 |
| 2017/0037594 A1* | 2/2017 | Wada | E02F 3/43 |
| 2018/0119384 A1* | 5/2018 | Imaizumi | E02F 9/265 |
| 2020/0011029 A1* | 1/2020 | Sano | E02F 9/265 |

FOREIGN PATENT DOCUMENTS

| | | |
|---|---|---|
| JP | 2007224511 A | 9/2007 |
| JP | 2011196457 A | 10/2011 |

* cited by examiner

WORK VEHICLE

TECHNICAL FIELD

The present invention relates to a work vehicle for performing loading work by excavating a work object such as earth and sand and minerals and loading the excavated work object into a loading destination such as a dump truck or a hopper.

BACKGROUND ART

When disposing load materials in a bucket into, for example, a dump truck, a wheel loader, which is a typical example of work vehicles, moves forward toward the dump truck while raising a lift arm to position the bucket above a vessel of the dump truck. At this time, the bucket does not have a constant angle with respect to the ground due to the link mechanism with the lift arm and/or the bell crank, which may cause inclination of the bucket in a tilt direction and result in spillage of the load materials.

Accordingly, in order to prevent the spillage of load materials during a loading operation, for example, the wheel loader according to Patent Literature 1 is designed to supply hydraulic oil for rotationally moving a bucket in a dump direction to a bucket actuator when an inclination angle of the bucket with respect to a reference plane reaches a predetermined threshold value.

CITATION LIST

Patent Literature

Patent Literature 1: JP-A-2007-224511

SUMMARY OF INVENTION

Technical Problem

However, in the determination of an inclination angle of the bucket with respect to the reference plane, the wheel loader according to Patent Literature 1 performs control based on an operation of the bucket without considering an inclination angle of the ground surface. Accordingly, for example, in the scene where a traveling state of the wheel loader whose bucket is containing load materials is switched from a flat ground traveling to an inclined ground traveling, if an operator forgets changing an angle of the bucket, the load materials may spill from the bucket.

Therefore, an object of the present invention is to provide a work vehicle capable of preventing spillage of load materials from a bucket, even without adjusting an angle of the bucket in a scene where a traveling state of the wheel loader is switched from a flat ground traveling to an inclined ground traveling.

Solution to Problem

In order to achieve the object above, the present invention provides

Advantageous Effects of Invention

According to the present invention, it is possible to prevent spillage of load materials from a bucket, even without adjusting an angle of the bucket in a scene where a traveling state of the wheel loader is switched from a flat ground traveling to an inclined ground traveling. The problems, configurations, and advantageous effects other than those described above will be clarified by explanation of the embodiment below.

DESCRIPTION OF EMBODIMENTS

Hereinafter, as an aspect of work vehicles according to an embodiment of the present invention, for example, a wheel loader for performing loading work by excavating such as earth and sand and minerals and loading the excavated materials into a dump truck will be described.

<Configuration of Wheel Loader 1>

Firstly, a configuration of a wheel loader 1 will be described with reference to FIG. 1.

Figure 1:
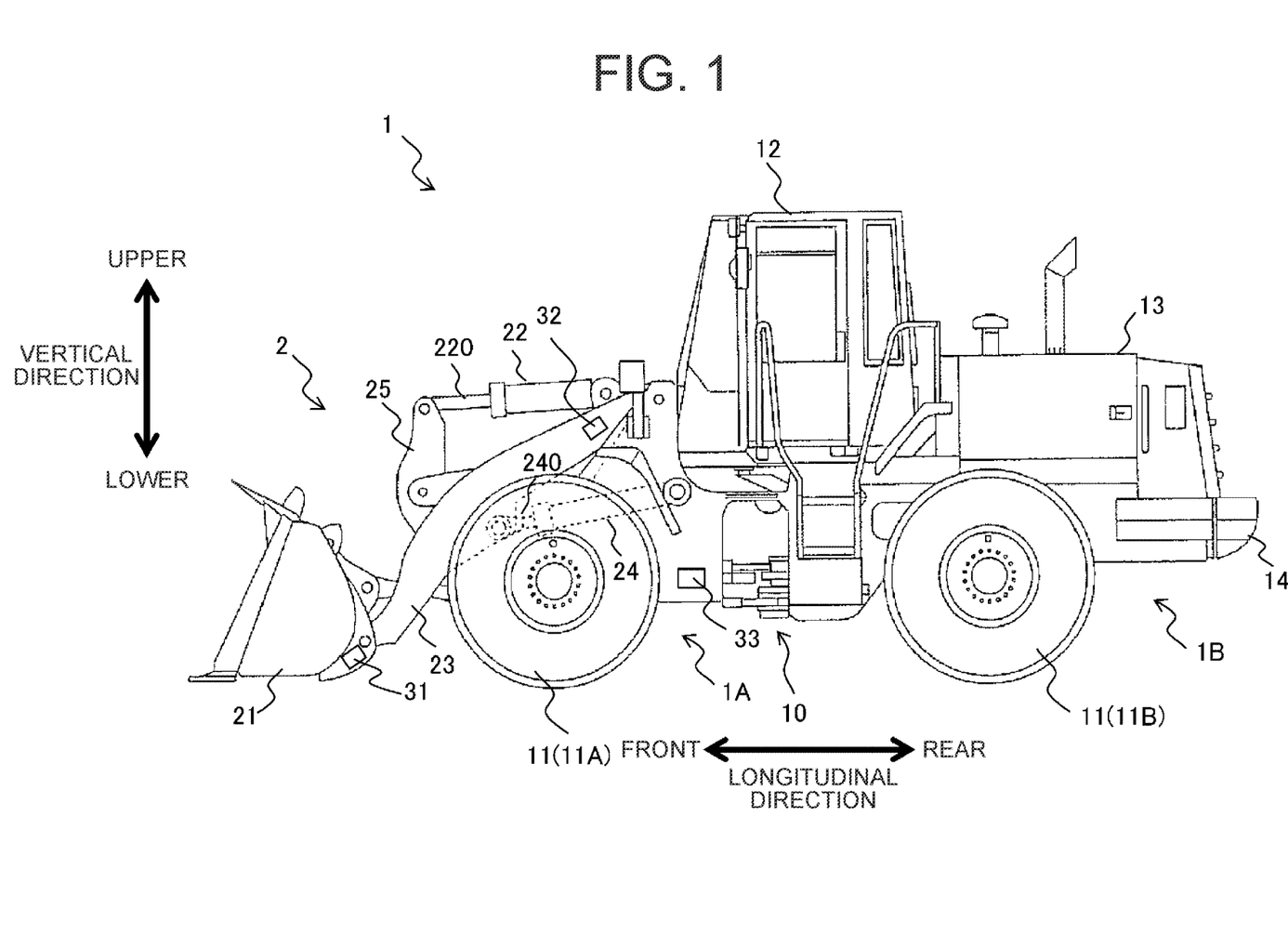
FIG. 1 is a side view of an appearance of a wheel loader according to the embodiment of the present invention.

FIG. 1 is a side view of an appearance of the wheel loader 1 according to the embodiment of the present invention.

The wheel loader 1 is an articulated type work vehicle which is swiveled on a central portion of the vehicle body and steered thereby. Specifically, a front frame 1A that is the front part of the vehicle body and a rear frame 1B that is the rear part of the vehicle body are connected to each other by a center joint 10 to swivel in the left and right direction so that the front frame 1A is bent in the left and right direction with respect to the rear frame 1B.

The wheel loader 1 includes four wheels 11. Two wheels 11 among them are provided, as front wheels 11A, on the left and right sides of the front frame 1A, respectively, and the remaining two wheels 11 are provided, as rear wheels 11B, on the left and right sides of the rear frame 1B, respectively. FIG. 1 illustrates, among the pair of left and right front wheels 11A and the pair of left and right rear wheels 11B, only the front wheel 11A and the rear wheel 11B provided on the left side.

On a front portion of the front frame 1A, a hydraulically driven work device 2 used for the loading work is provided. The work device 2 includes a bucket 21 for scooping and discharging a work object such as earth and sand and minerals, a bucket cylinder 22 for driving the bucket 21, a lift arm 23 serving as an arm member to which the bucket 21 is mounted at its distal end portion, two lift arm cylinders 24 for driving the lift arm 23, and a bell crank 25 rotatably connected to the lift arm 23 and forming a link mechanism between the bucket 21 and the bucket cylinder 22. Although the two lift arm cylinders 24 are arranged side by side in the lateral direction of the vehicle body, FIG. 1 illustrates only one of the lift arm cylinders 24 which is disposed on the left side by a broken line.

When the bucket cylinder 22 is supplied with hydraulic oil and thus a rod 220 extends, the bucket 21 rotationally moves in the upper and lower direction with respect to the lift arm 23. More specifically, extension of the rod 220 of the bucket cylinder 22 causes a tilt operation of the bucket 24 (rotational movement in the upper direction with respect to the lift arm 23), and contraction of the rod 220 causes a dump operation (rotational movement in the lower direction with respect to the lift arm 23).

A bucket angle sensor 31 configured to detect an angle of the bucket 21 with respect to the lift arm 23 (hereinafter, simply referred to as "bucket angle") is mounted to a portion of the bucket 21 near the connection portion between the bucket 21 and the lift arm 23.

The lift arm 23 is mounted such that its proximal end portion is mounted to the front frame 1A. When the two arm cylinders 24 are supplied with hydraulic oil and thus each of rods 240 extends or contracts, the lift arm 23 rotationally moves in the upper and lower direction with respect to the front frame 1A. More specifically, extension of the rods 240 of the two lift arm cylinders 24 causes a rotational movement of the lift arm 23 in the upper direction with respect to the front frame 1A, and contraction of the rods 240 causes a rotational movement of the lift arm 23 in the lower direction with respect to the front frame 1A.

An arm angle sensor 32 configured to detect an angle of the lift arm 23 with respect to the front frame 1A (hereinafter, simply referred to as "lift arm angle") is mounted to a portion of the lift arm 23 near the connection portion between the lift arm 23 and the front frame 1A. The arm angle sensor 32 is an aspect of a height sensor for detecting the height of the lift arm 23, and can detect the height of the lift arm 23 based on the lift arm angle. Note that, since the height of the lift arm 23 corresponds to the height (position) of the bucket 21, the arm angle sensor 32 also can be used to detect the height of the bucket 21.

An inclination sensor 33 configured to detect an inclination angle of the vehicle body (hereinafter, simply referred to as "inclination angle") is mounted to the front frame 1A. In the present embodiment, the inclination sensor 33 is arranged on the left side of the front frame 1A on which the working device 2 is mounted, however, there is no particular limitation on the arrangement location of the inclination sensor 33. For example, the inclination sensor 33 may be arranged at a lower portion of an operator's seat in an operator's cab 12, or may be arranged on the rear frame 1B.

The rear frame 1B includes the operator's cab 12 provided for an operator to get in, a machine room 13 for accommodating therein respective devices necessary for driving the wheel loader 1, and a counterweight 14 for balancing the vehicle body with the work device 2 to prevent the vehicle body from tilting. On the rear frame 1B, the operator's cab 12 is provided in the front thereof, the counterweight 14 is provided in the rear thereof, and the machine room 13 is provided between the operator's cab 12 and the counterweight 14.

<Movements of Wheel Loader 1 During Loading Work>

Next, movements of the wheel loader 1 during the loading work will be described with reference to FIG. 2 to FIG. 5.

Figure 2:
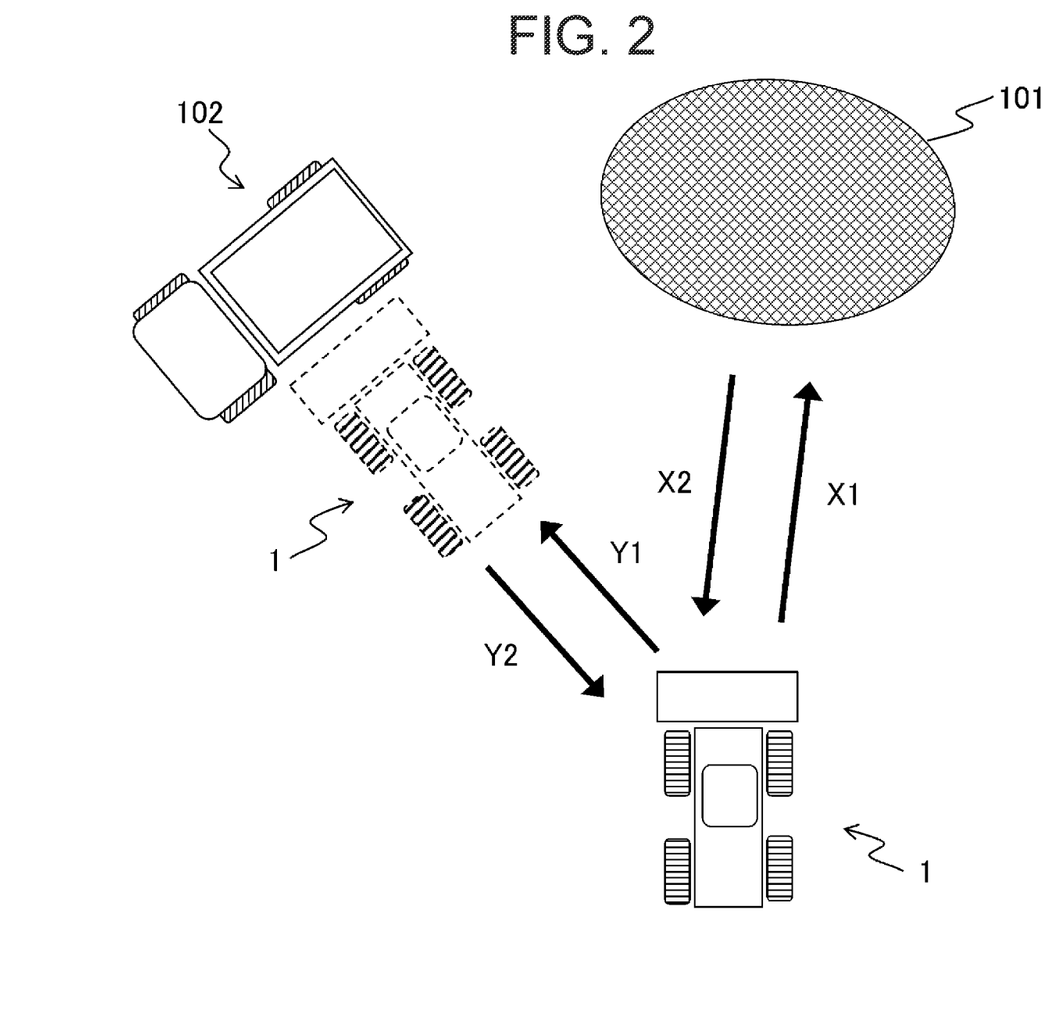
FIG. 2 explains the V-shape loading performed by a wheel loader.
Figure 3:
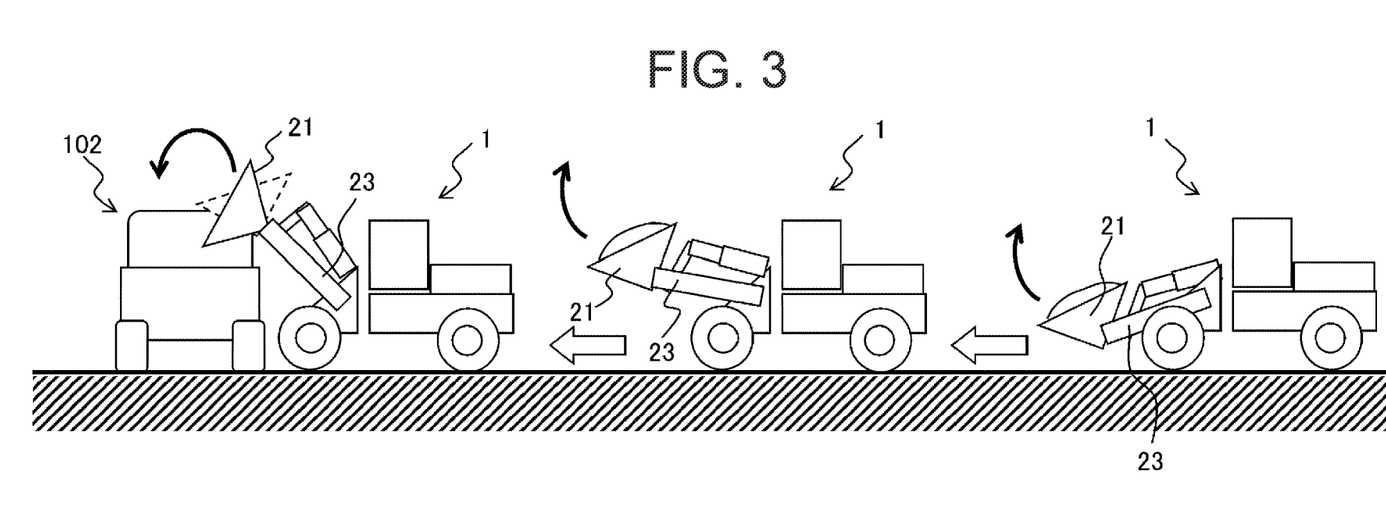
FIG. 3 explains dump approach movements of a wheel loader.
Figure 4:
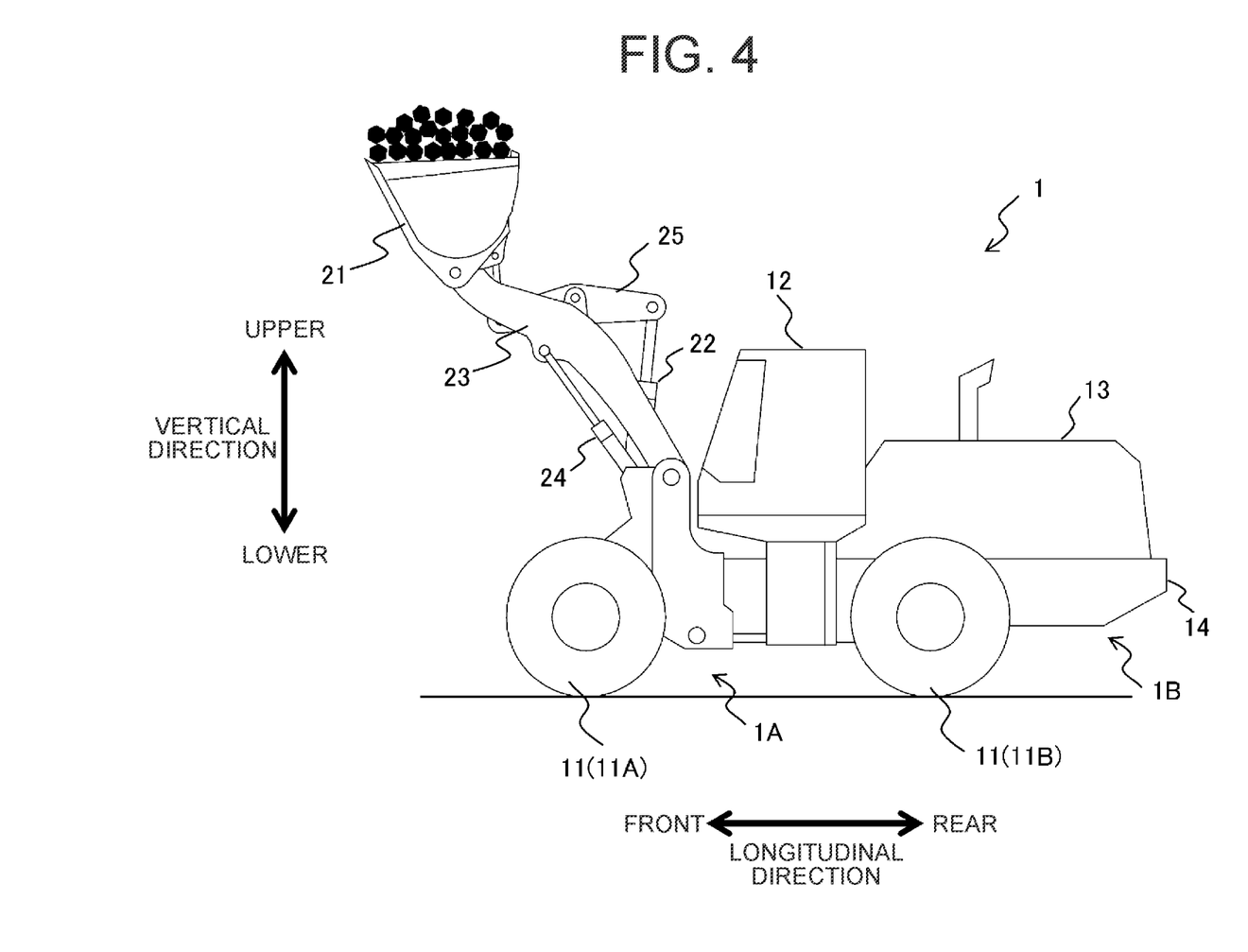
FIG. 4 explains a case where a wheel loader raises a bucket containing load materials while traveling on the flat ground.
Figure 5:
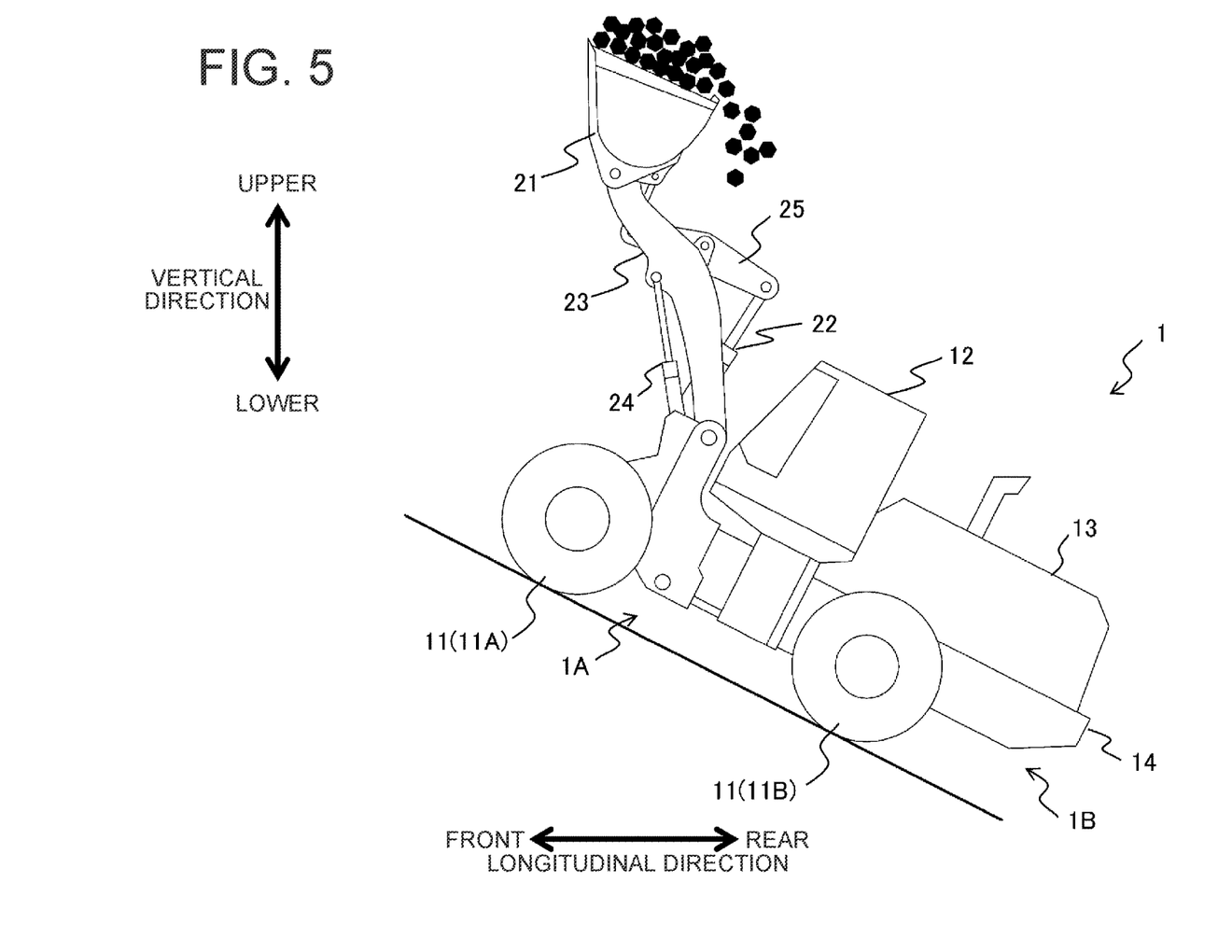
FIG. 5 explains a case where a wheel loader raises a bucket containing load materials while ascending a hill.

FIG. 2 explains the V-shape loading performed by the wheel loader 1. FIG. 3 explains the dump approach movements of the wheel loader 1. FIG. 4 explains the case where the wheel loader 1 raises the bucket 21 containing load materials while traveling on the flat ground. FIG. 5 explains the case where the wheel loader 1 raises the bucket 21 containing load materials while ascending a hill.

In the loading work, firstly, the wheel loader 1 moves forward toward a pile 101 which is an object to be excavated, and performs an excavation operation by making the bucket 21 thrust into the pile 101 (arrow X1 illustrated in FIG. 2). Upon completing the excavation operation, the wheel loader 1 temporarily moves backward to the original position (arrow X2 illustrated in FIG. 2).

Next, the wheel loader 1 performs a dump approach operation by moving forward toward a dump truck 102 which is a loading destination and stopping in front of the dump truck 102 (arrow Y1 illustrated in FIG. 2). Note that FIG. 2 illustrates the wheel loader 1 which has stopped in front of the dump truck 102 by a broken line.

In the dump approach operation, as illustrated in FIG. 3, specifically, the operator fully steps on an accelerator pedal (full acceleration), and also performs a raising operation of the lift arm 23 (state on the right side of FIG. 3). Next, the operator further raises the lift arm 21 while keeping the full acceleration state, and at the same time, adjusts the vehicle speed by stepping on a brake pedal a little so as to prevent the vehicle body from colliding with the dump truck 102 (state on the center of FIG. 3). Then, the operator fully steps on the brake pedal to make the vehicle body stop in front of the dump truck 102, and causes the dump operation of the bucket 21 so as to load the load materials (work object) in the bucket 21 into the dump truck 102 (state on the left of FIG. 3).

As illustrated in FIG. 2, upon completing the loading operation into the dump truck 102, the wheel loader 1 moves backward to the original position (arrow Y2 illustrated in FIG. 2). In this way, the wheel loader 1 performs the excavation operation and the loading operation by a method called a V-shape loading in which the wheel loader 1 reciprocates along a V-shape between the pile 101 and the dump truck 102.

In the dump approach operation illustrated in FIG. 3, as described above, the wheel loader 1 travels toward the dump truck 102 while raising the lift arm 23 to position the bucket 21 above the vessel of the dump truck 102. As a result, the bucket 21 does not have a constant angle with respect to the ground due to the link mechanism with the lift arm 23 and/or the bell crank 25, which may cause spillage of the load materials in the bucket 21.

With this regard, when raising the lift arm 23 with the bucket 21 containing the load materials, the operator adjusts the bucket angle so as to prevent spillage of the load materials from the bucket 21. However, such adjustment of the bucket angle requires the operator to have high level skills. Therefore, the wheel loader 1 is equipped with a control system for automatically controlling the bucket angle to support inexperienced operators.

Here, the wheel loader 1 does not always perform the loading operation on the flat ground as illustrated in FIG. 4, but may perform it on the uphill as illustrated in FIG. 5. The case of performing the loading operation while traveling uphill includes, for example, the case of scooping the earth and sand into the bucket 21 while ascending a hill and raising the lift arm 23 to pile the scooped earth and sand up, and the case of loading the load materials into the hopper while ascending a hill.

Although the bucket angle of the wheel loader 1 illustrated in FIG. 5 is the same as the bucket angle of the wheel loader 1 illustrated in FIG. 4, during the loading operation while ascending a hill (in the case of FIG. 5), as compared with during the loading operation while traveling on the flat ground (in the case of FIG. 4), the bucket 21 is easily inclined in the tilt direction since the rear side of the vehicle body becomes lower than the front side of the vehicle body and thus the vehicle body is inclined rearward. Accordingly, even in the case where the bucket angle has been controlled to prevent spillage of the load materials in the bucket 21 during the loading operation while traveling on the flat ground, the load materials may spill from the bucket 21 at the time of the loading operation while traveling uphill.

In this connection, note that the wheel loader 1 performs the loading operation not only on an uphill, but also on a downhill. In the case of the downhill, since the front side of the vehicle body becomes lower than the rear side of the vehicle body and thus the vehicle body is inclined forward, the bucket 21 is easily inclined in the dump direction as compared with during the loading operation while traveling on the flat ground. Accordingly, the load materials may spill from the bucket 21 in the same manner as the case of the uphill.

<Drive System of Bucket 21>

Next, a drive system of the bucket 21 will be described with reference to FIG. 6.

Figure 6:
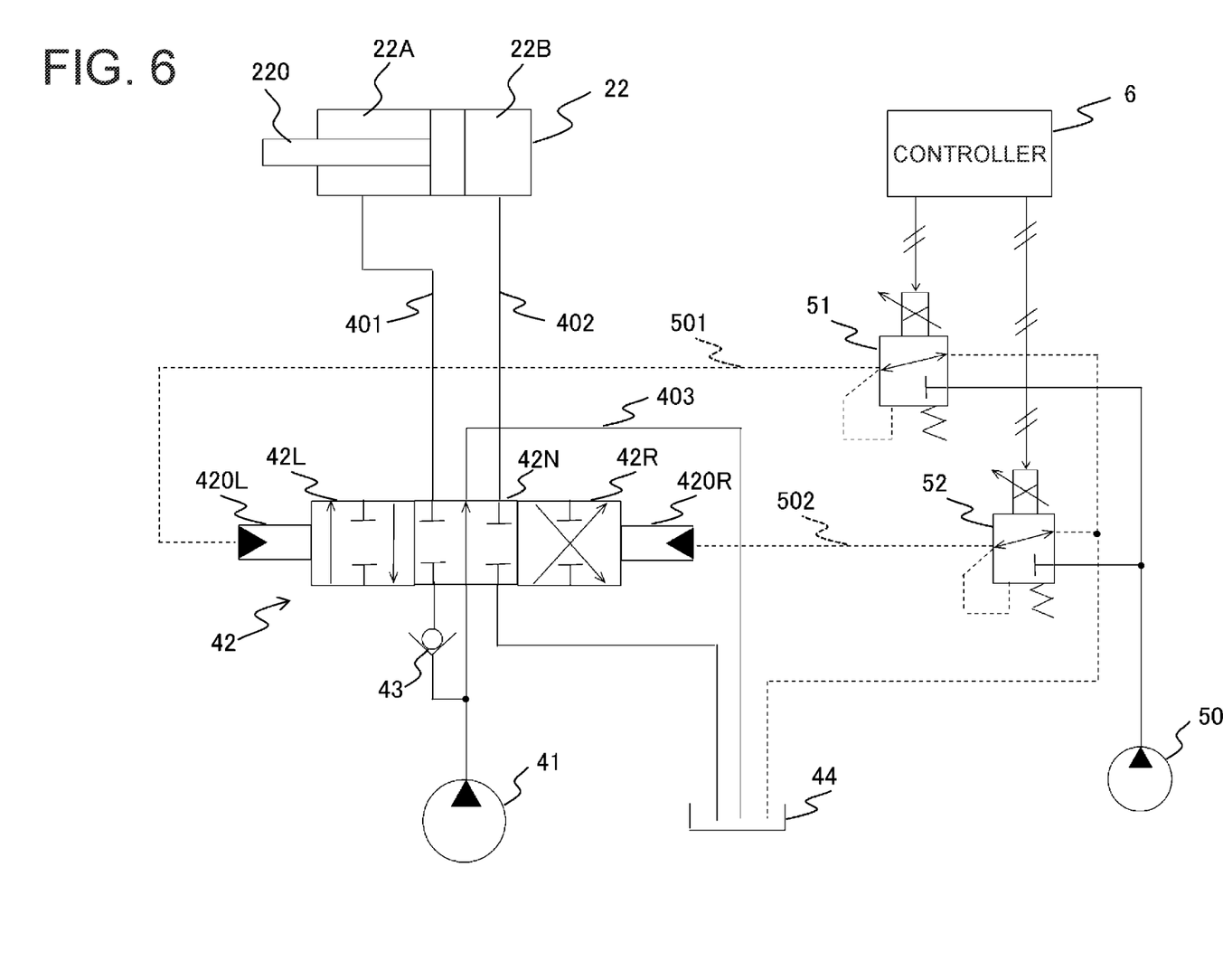
FIG. 6 illustrates a drive circuit of a bucket cylinder.

FIG. 6 illustrates a drive circuit of the bucket cylinder 22.

The drive system of the bucket 21 includes the bucket cylinder 22, a main pump 41 which is a hydraulic pump for supplying hydraulic oil to the bucket cylinder 22, a directional control valve 42 which is provided between the main pump 41 and the bucket cylinder 22, a check valve 43 which is provided between the main pump 41 and the directional control valve 42 to prevent backflow of the hydraulic oil to the main pump 41, and a tank 44 for storing the hydraulic oil.

The directional control valve 42 includes a first switching position 42L, a second switching position 42R, and a neutral position 42N. Each of the first switching position 42L, the second switching position 42R, and the neutral position 42N is switched in accordance with displacement of a shaft-shaped spool provided inside the directional control valve 42, whereby the directional control valve 42 controls a flow (direction and flow rate) of the hydraulic oil supplied from the main pump 41 to the bucket cylinder 22.

The first switching position 42L is provided to direct the hydraulic oil discharged from the main pump 41 to a rod chamber 22A of the bucket cylinder 22 through a first connection pipe 401, and direct the hydraulic oil discharged from a bottom chamber 24B of the bucket cylinder 22 to the tank 44 through a second connection pipe 402. This causes contraction of the rod 220 of the bucket cylinder 22, and thus the bucket 21 dumps.

The second switching position 42R is provided to direct the hydraulic oil discharged from the main pump 41 to a bottom chamber 22B of the bucket cylinder 22 through the second connection pipe 402, and direct the hydraulic oil discharged from the rod chamber 22A of the bucket cylinder 22 to the tank 44 through the first connection pipe 401. This causes extension of the rod 220 of the bucket cylinder 22, and thus the bucket 21 tilts.

The neutral position 42N is provided to direct the hydraulic oil discharged from the main pump 41 directly to the tank 44 through a center bypass circuit 403. In this case, the rod 220 of the bucket cylinder 22 is not actuated, and thus the bucket 21 stops.

The first switching position 42L, the second switching position 42R, and the neutral position 42N are arranged from one side in the axial direction of the spool toward the other side in the order of the first switching position 42L, the second switching position 42R, and the neutral position 42N. In the directional control valve 42, a first pilot oil chamber 420L is provided on the side of the first switching position 42L, and a second pilot oil chamber 420R is provided on the side of the second switching position 42R, respectively.

The first pilot oil chamber 420L is connected to a pilot pump 50 by a first pilot pipe 501. On the first pilot pipe 501, that is, between the first pilot oil chamber 420L and the pilot pump 50, a first solenoid proportional valve 51 is provided. The first solenoid proportional valve 51 is configured to control the pilot pressure discharged from the pilot pump 50 and applied to the first pilot oil chamber 420L in accordance with a signal output from a controller 6.

In the same manner as above, the second pilot chamber 420R is connected to the pilot pump 50 by a second pilot pipe 502. On the second pilot pipe 502, that is, between the second pilot oil chamber 420R and the pilot pump 50, a second solenoid proportional valve 52 is provided. The second solenoid proportional valve 52 is configured to control the pilot pressure discharged from the pilot pump 50 and applied to the second pilot oil chamber 420R in accordance with a signal output from the controller 6.

In this way, the directional control valve 42 is controlled by the first solenoid proportional valve 51 and the second solenoid proportional valve 52, and the spool provided in the directional control valve 42 is displaced in proportion to the signal output from the controller 6. Then, the bucket angle is changed in proportion to the displacement volume of the spool. That is, when the spool moves from the neutral position 42N toward the first switching position 42L, the bucket 21 rotationally moves in the dump direction by an angle corresponding to the displacement volume, and when the spool moves from the neutral position 42N toward the second switching position 42R, the bucket 21 rotationally moves in the tilt direction by an angle corresponding to the displacement volume.

Note that each of the first pilot oil chamber 420L and the second pilot oil chamber 420R is connected to the tank 44. In the case where a value of the signal output from the controller 6 to each of the first solenoid proportional valve 51 and the second solenoid proportional valve 52 is less than an urging force of a spring provided in each of the first solenoid proportional valve 51 and the second solenoid proportional valve 52, the pilot pressure oil in the first pilot oil chamber 420L and the second pilot oil chamber 420R is discharged to the tank 44.

<Configuration of Controller 6>

Next, a configuration of the controller 6 will be described with reference to FIG. 7.

Figure 7:
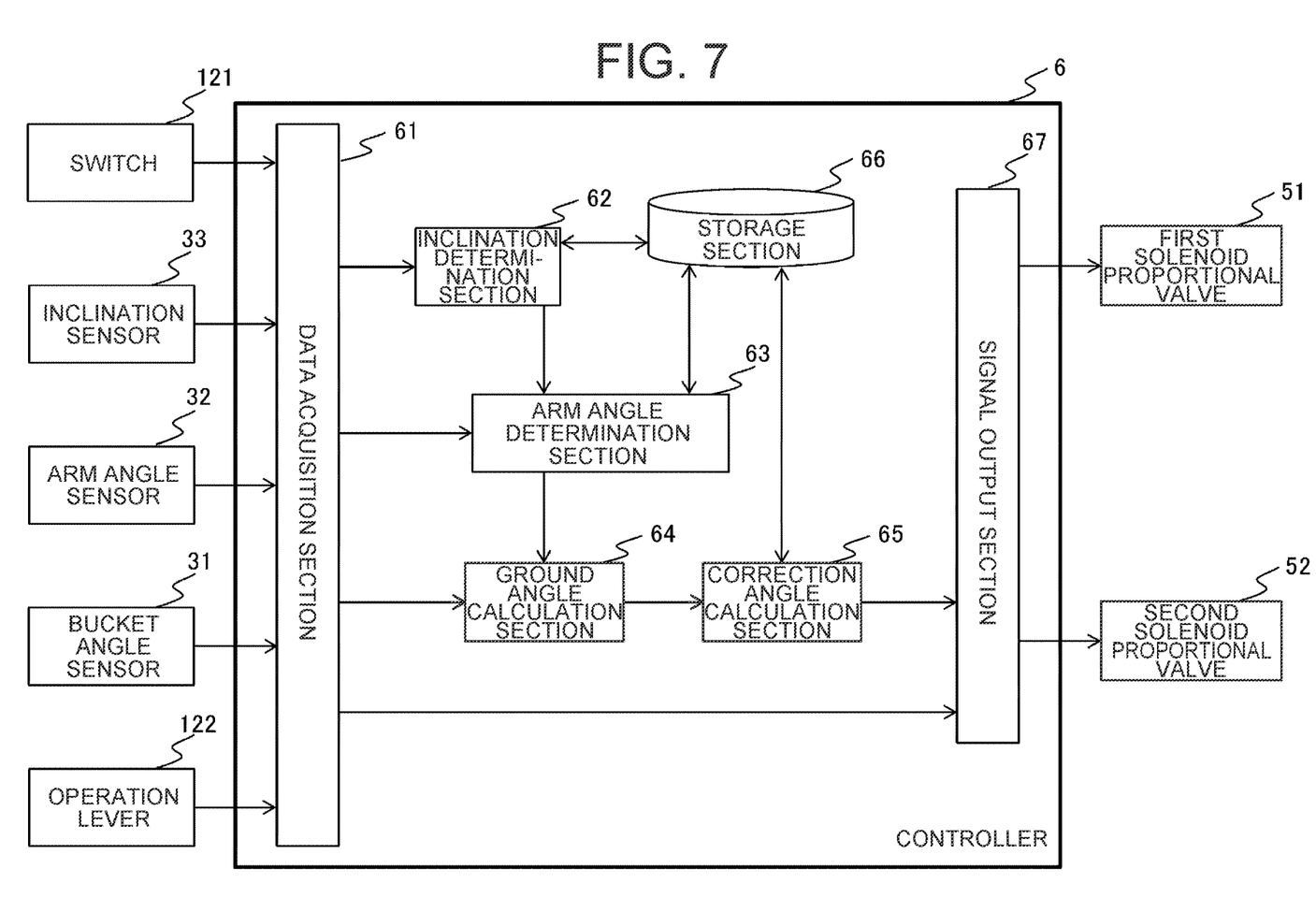
FIG. 7 is a functional block diagram illustrating functions of a controller.

FIG. 7 is a functional block diagram illustrating the functions of the controller 6.

The controller 6 is configured such that a CPU, a RAM, a ROM, an HDD, an input I/F, and an output I/F are connected to each other via a bus. Then, various operation devices such as a switch 121 for enabling the correction processing, which will be described later, performed by the controller 6 and an operation lever 122 serving as an electric operation device for operating the bucket 21, and various sensors such as the bucket angle sensor 31, the arm angle sensor 32, and the inclination sensor 33 are connected to the input I/F while the first solenoid proportional valve 51 and the second solenoid proportional valve 52 are connected to the output I/F.

In this hardware configuration, the CPU reads out a control program (software) stored in a recording medium such as the ROM, the HDD or an optical disc, and loads and executes the control program on the RAM, whereby the control program and the hardware collaborate to implement the functions of the controller 6.

In the present embodiment, the controller 6 is described as a computer configured by a combination of software and hardware. However, the controller 5 is not limited thereto, and as one of the examples of configurations of other computers, an integrated circuit for implementing the functions of the control program executed on the side of the wheel loader 1 may be used.

The controller 6 includes a data acquisition section 61, an inclination determination section 62, an arm angle determination section 63, a ground angle calculation section 64, a correction angle calculation section 65, a storage section 66, and a signal output section 67.

The data acquisition section 61 is configured to acquire data relating to a signal output from the switch 121, an operation signal output from the operation lever 122, an inclination angle $\theta$ detected by the inclination sensor 33, a lift arm angle $\alpha$ detected by the arm angle sensor 32, and a bucket angle $\beta$ detected by the bucket angle sensor 31, respectively.

The inclination determination section 62 is configured to determine whether the vehicle body is inclined based on the inclination angle $\theta$ acquired by the data acquisition section 61. In the present embodiment, the inclination determination section 62 determines whether an absolute value $|\theta|$ of the inclination angle acquired by the data acquisition section 61 is equal to or more than a predetermined inclination angle threshold value $\theta$th ($>0$) (hereinafter, simply referred to as "inclination angle threshold value $\theta$th").

In the case where the wheel loader 1 is ascending a hill, in other words, in the case where the inclination determination section 62 determines that the rear side of the vehicle body becomes lower than the front side of the vehicle body and thus the vehicle body is in a state of being inclined rearward, the inclination angle $\theta$ acquired by the data acquisition section 61 is "positive" ($\theta>0$). On the other hand, in the case where the wheel loader 1 is descending a hill, in other words, in the case where the inclination determination section 62 determines that the front side of the vehicle body becomes lower than the rear side of the vehicle body and thus the vehicle body is in a state of being inclined forward, the inclination angle $\theta$ acquired by the data acquisition section 61 is negative ($\theta<0$). In this way, the inclination determination section 62 determines a state of inclination (rearward inclined state or forward inclined state) of the vehicle body by using an absolute value $|\theta|$ of an inclination angle acquired by the data acquisition section 61.

The "inclination angle threshold value $\theta$th" is a predetermined angle threshold value set based on an inclination angle of the vehicle body formed in the occurrence of spillage of the load materials in the bucket 21 in a state where the lift arm 23 is at a height position higher than a height position in its horizontal posture, and for example, is set to about 5°. Here, the "horizontal posture of the lift arm 23" is, for example, the posture of the lift arm 23 in a haulage operation, which is the posture of the lift arm 23 when the bucket 21 in a full tilt state is positioned on the level where it does not come into contact with the ground. At this time, the two lift arm cylinders 24 extend horizontally in the forward direction from the front frame 1A.

The arm angle determination section 63 is configured to determine whether the lift arm angle $\alpha$ acquired by the data acquisition section 61 is more than a predetermined arm angle threshold value $\alpha$th (hereinafter, simply referred to as "arm angle threshold value $\alpha$th"). The "arm angle threshold value $\alpha$th" is a value corresponding to a lift arm angle in the horizontal posture of the lift arm 23.

That is, the arm angle determination section 63 determines whether the height of the lift arm 23 corresponding to the lift arm angle $\alpha$ acquired by the data acquisition section 61 is more than the height of the lift arm 23 in the horizontal posture. In other words, the arm angle determination section 63 determines whether the height position of the bucket 21 corresponding to the lift arm angle $\alpha$ acquired by the data acquisition section 61 is higher than a predetermined height. In the present embodiment, the "predetermined height" is the height of the bucket 21 in the case where the lift arm 23 is in the horizontal posture. Meanwhile, the "predetermined height" is not limited thereto, and it can be arbitrarily set in accordance with the environment in the work site and/or the specifications of the wheel loader 1.

The ground angle calculation section 64 is configured to calculate an angle $\gamma$ of the bucket 21 with respect to the ground surface of the front wheel 11A (hereinafter, referred to as "bucket-to-ground angle $\gamma$") based on the bucket angle $\beta$ and the inclination angle $\theta$ acquired by the data acquisition section 61.

The correction angle calculation section 65 is configured to calculate a correction angle $\gamma$c that allows the bucket-to-ground angle $\gamma$ calculated by the ground angle calculation section 64 to be a reference ground angle $\gamma$th which is a bucket-to-ground angle on the flat ground when the wheel loader 1 starts the inclined ground traveling.

The storage section 66 is a memory, and is configured to store the inclination angle threshold value $\theta$th, the arm angle threshold value $\alpha$th, and the reference ground angle $\gamma$th.

The signal output section 67 is configured to output a correction signal according to the correction angle $\gamma$c calculated by the correction angle calculation section 65 to each of the first solenoid proportional valve 51 and the second solenoid proportional valve 52. Thus, the bucket cylinder 22 automatically extends to cause the bucket 21 to dump, and the angle of the bucket 21 is corrected to the correction angle $\gamma$c. Furthermore, in this case, when an operation signal corresponding to an operation amount is input from the operation lever 122 to the data acquisition section 61, the signal output section 67 outputs a command signal based on the operation signal to each of the first solenoid proportional valve 51 and the second solenoid proportional valve 52.

<Processing in Controller 6>

Next, a specific flow of the processing executed in the controller 6 will be described with reference to FIG. 8. The operations and effects achieved by the processing by the controller 6 will be described with reference to FIG. 9 and FIG. 10.

Figure 8:
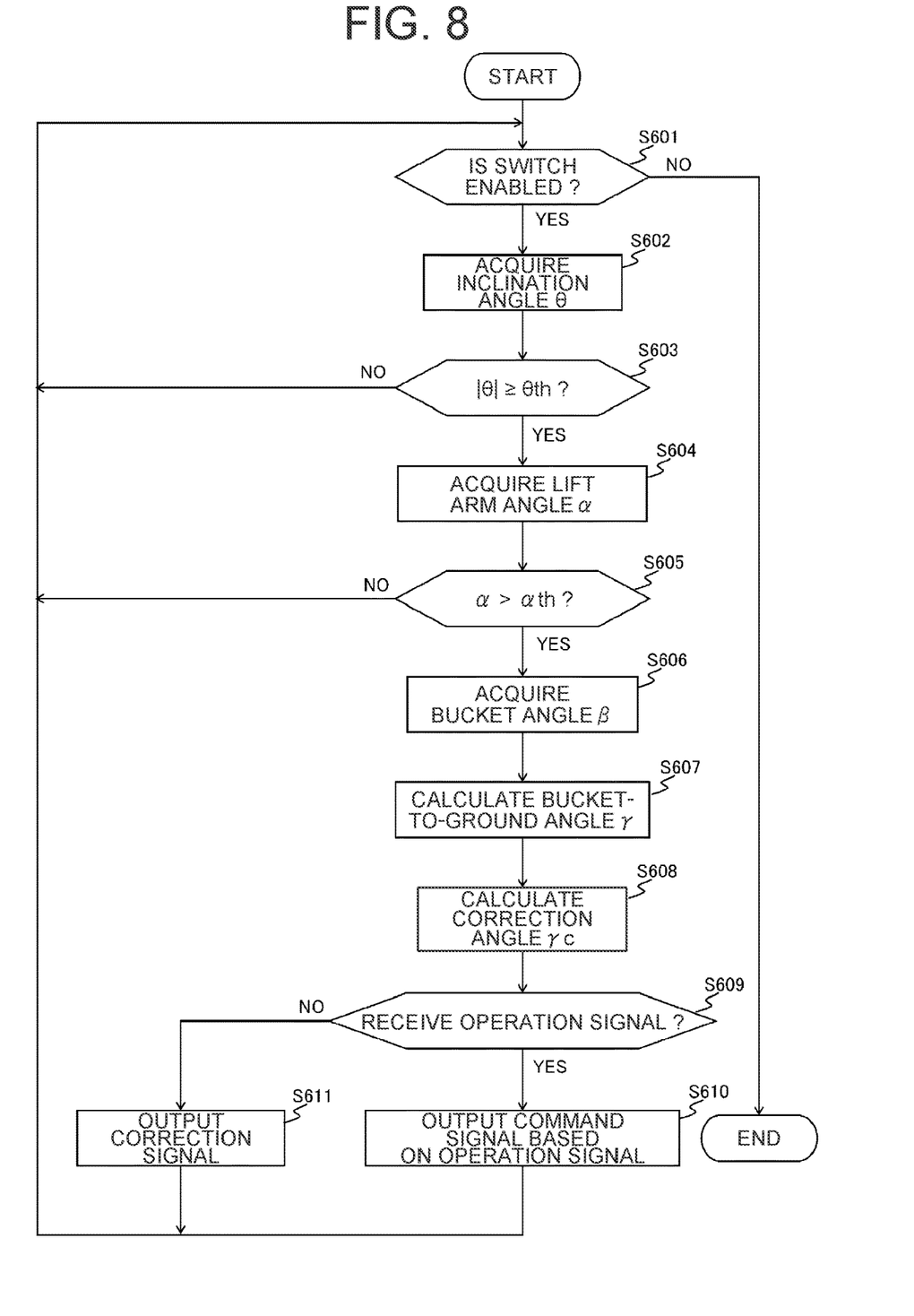
FIG. 8 is a flowchart illustrating a flow of processing executed by a controller.
Figure 9:
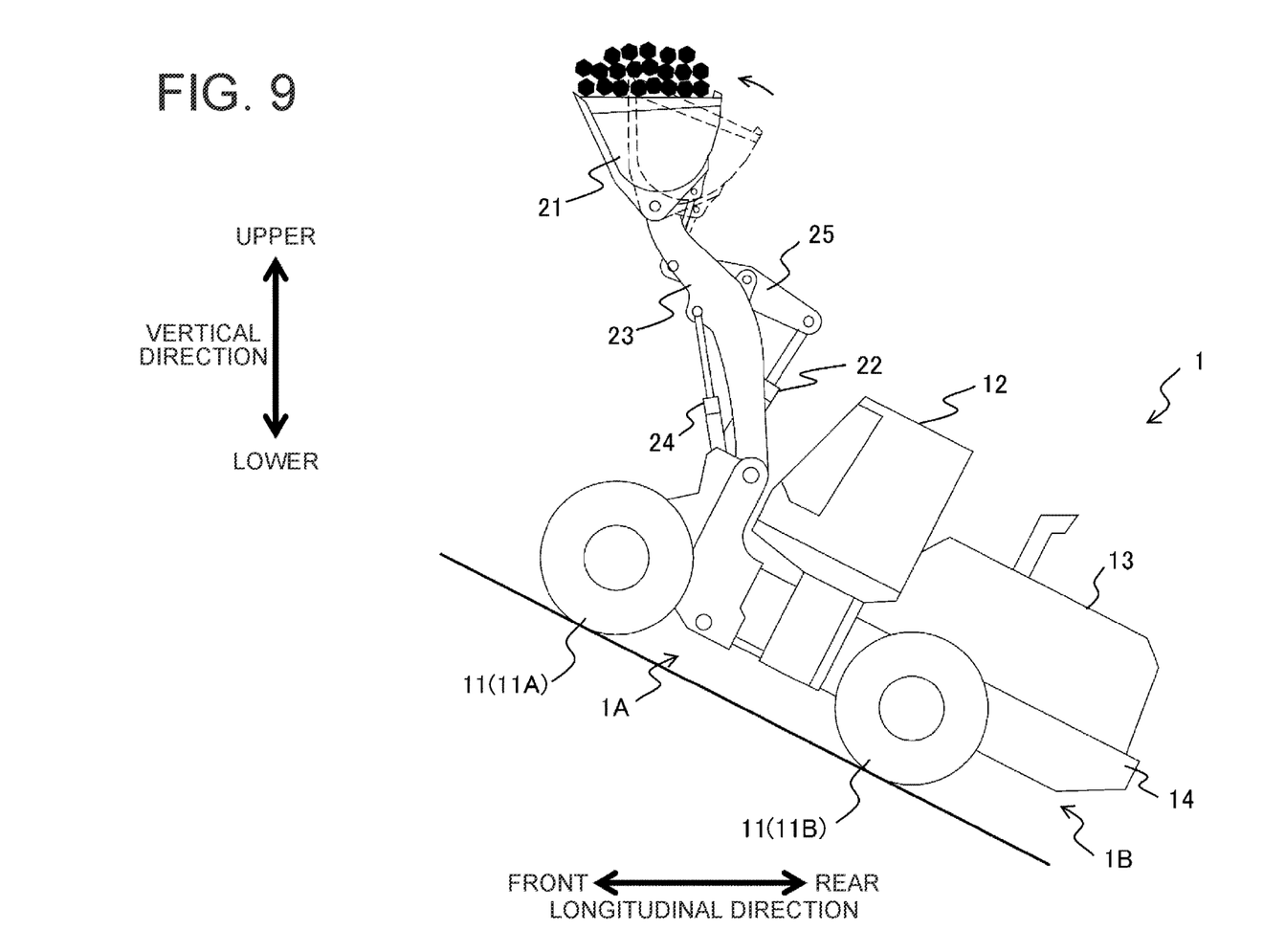
FIG. 9 explains operations of a bucket during correction processing executed by a controller.
Figure 10:
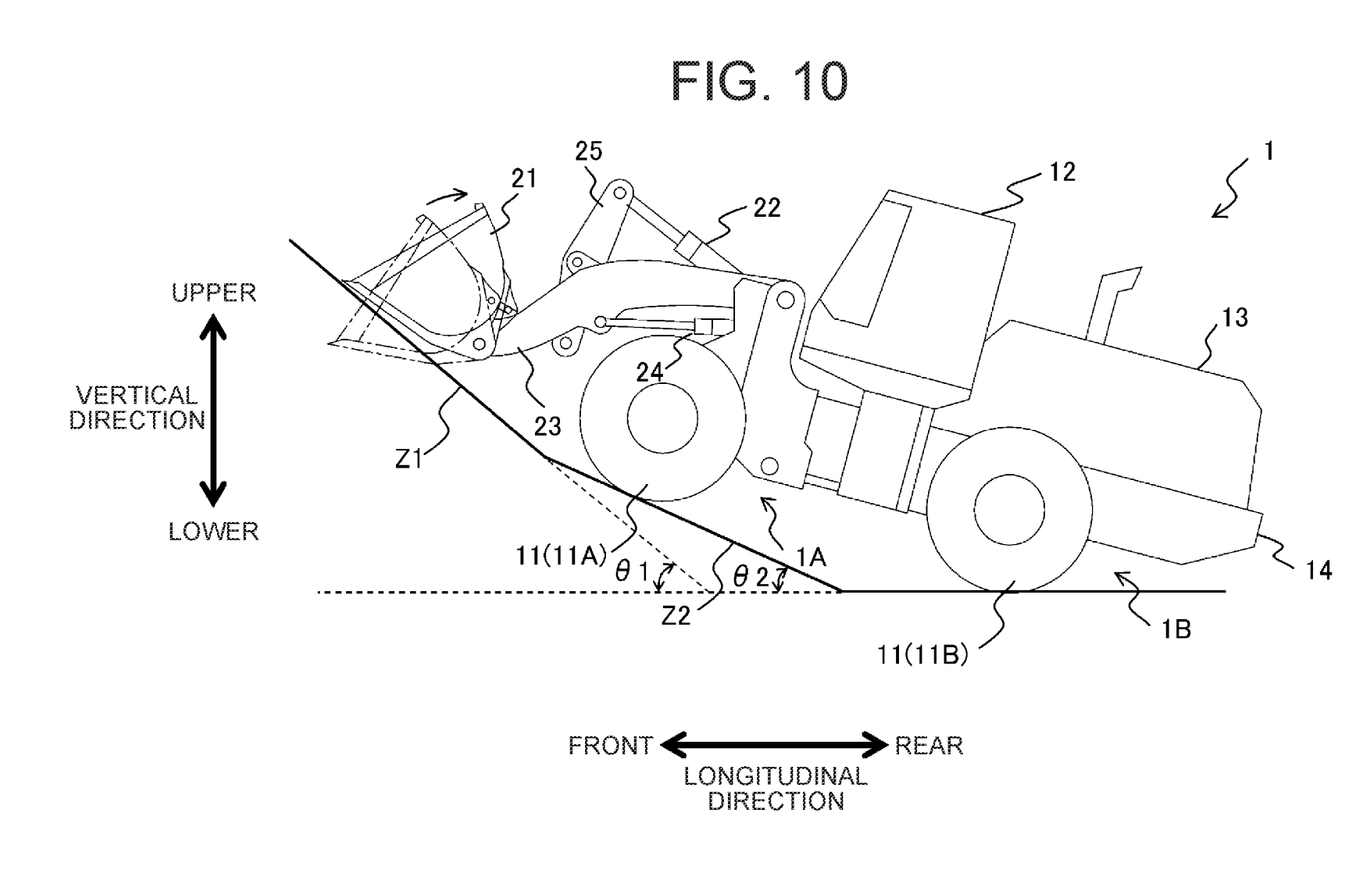
FIG. 10 explains a state of a bucket in a case where a determination result of step S605 illustrated in FIG. 8 is NO.

FIG. 8 is a flowchart illustrating a flow of the processing executed by the controller 6. FIG. 9 explains the operations of the bucket 21 during the correction processing executed by the controller 6. FIG. 10 explains a state of the bucket 21 when a determination result of step S605 illustrated in FIG. 8 is NO.

As illustrated in FIG. 8, firstly, the controller 6 determines whether a valid signal is input from the switch 121 to the data acquisition section 61, that is, whether the switch 121 has been enabled (step S601). In this way, in the present embodiment, the operator can arbitrarily select whether to enable or disable the correction in the controller 6 by operating the switch 121.

When it is determined that the switch 121 is enabled in step S601 (step S601/YES), the data acquisition section 61 acquires the inclination angle $\theta$ detected by the inclination sensor 33 (step S602). On the other hand, when it is determined in step S601 that the switch 121 remains disabled (step S601/NO), the processing in the controller 6 is ended.

Next, the inclination determination section 62 determines whether the absolute value |θ| of the inclination angle obtained in step S602 is equal to or more than the inclination angle threshold value θth (step S603). When it is determined in step S603 that the absolute value |θ| of the inclination angle is equal to or more than the inclination angle threshold value θth (|θ|≥θth) (step S603/YES), the data acquisition section 61 acquires the lift arm angle α detected by the arm angle sensor 32 (step S604).

Next, the arm angle determination section 63 determines whether the lift arm angle α acquired in step S604 is more than the arm angle threshold value αth (step S605). When it is determined in step S605 that the lift arm angle α is more than the arm angle threshold value αth (α>αth) (step S605/YES), the data acquisition section 61 acquires the bucket angle β detected by the bucket angle sensor 31 (step S606).

Subsequently, the ground angle calculation section 64 calculates the bucket-to-ground angle γ based on the inclination angle θ acquired in step S602 and the bucket angle β acquired in step S606 (step S607). Then, the correction angle calculation section 65 calculates the correction angle γc based on the bucket-to-ground angle γ calculated in step S607 and the reference ground angle γth stored in the storage section 66 (step S608).

Next, the controller 6 determines whether an operation signal is input from the operation lever 122 to the data acquisition section 61 (step S609). When it is determined in the step S609 that the operation signal is input from the operation lever 122 to the data acquisition section 61 (step S609/YES), the signal output section 67 outputs a command signal based on the input operation signal to each of the first solenoid proportional valve 51 and the second solenoid proportional valve 52 (step S610). Then, the processing returns to step S601.

On the other hand, when it is determined in step S609 that the operation signal is not input from the operation lever 122 to the data acquisition section 61 (step S609/NO), the signal output section 67 outputs a correction signal according to the correction angle γc calculated in step S608 to each of the first solenoid proportional valve 51 and the second solenoid proportional valve 52 (step S611). Then, the processing returns to step S601.

As described above, during execution of the angle correction of the bucket 21 by the controller 6, when the operation signal is input from the operation lever 122 to the data acquisition section 61, an operation of the operation lever 122 is prioritized. With this configuration, in the case where the wheel loader 1 arrives in front of a loading destination such as a dump truck or a hopper to discharge the load materials loaded in the bucket 21, the angle correction of the bucket 21 is disabled so as to allow the dump operation of the bucket 21 to be performed by the operator.

As illustrated in FIG. 9, when the wheel loader 1 is ascending a hill while raising the lift arm 23, as described above, the bucket 21 is easily inclined in the tilt direction since the vehicle body is inclined backward (state illustrated by a broken line in FIG. 9). For example, suppose that the inclination angle of the uphill is 10° (θ=10°) and the reference ground angle γth is 30° (γth=30°), the controller 6 automatically controls the bucket cylinder 22 in the extending direction to cause the bucket 21 to dump (indicated by an arrow in FIG. 9) so that the bucket-to-ground angle γ is maintained constantly at the reference ground angle γth (=30°). As a result, in particular, in a scene where a traveling state is switched from the flat ground traveling to the inclined ground traveling, it is possible to suppress the spillage of the load materials from the bucket 21 even if the operator does not adjust the angle of the bucket 21.

Since the wheel loader 1 generally performs the loading operation on an uphill, the case where the inclined ground is an uphill has been mainly described in the above, however, the inclined ground is not necessarily an uphill. Depending on the environment in the work site, for example, the wheel loader 1 may descend the hill after climbing, and at the time of descending, it is possible to control the bucket 21 in the tilt direction by the correction performed by the controller 6 so as to suppress the spillage of the load materials from the bucket 21 or avoid forgetting of the tilt operation by the operator.

In the present embodiment, when it is determined in step S603 that the absolute value |θ| of the inclination angle is less than the inclination angle threshold value θth (|θ|<θth) (step S603/NO), the controller 6 does not perform the bucket angle correction processing, and makes the processing return to step S601. Thus, the controller 6 does not correct the bucket angle in the case of a slight inclination such as when the vehicle body runs on a small stone or the like and thus is inclined.

Similarly, in the present embodiment, when it is determined in step S605 that the lift arm angle α is equal to or less than the arm angle threshold value αth (α≤αth) (step S605/NO), the controller 6 does not perform the bucket angle correction processing, and makes the processing return to step S601.

FIG. 10 illustrates the inclined ground including a first uphill Z1 and a second uphill Z2, which have different inclination angles and are continued to each other. As illustrated in FIG. 10, an angle θ1 of the inclination of the first uphill Z1 located further from the wheel loader 1 is steeper than an angle θ2 of the inclination of the second uphill Z2 located closer to the wheel loader 1 (θ1>θ2), and the height of the lift arm 23 is equal to or less than the height in the horizontal posture (that is, α≤αth). In this case, if the bucket 21 is controlled in the dump direction by the correction of the controller 6, the bucket 21 may stick into the first uphill Z1 (indicated by a chain line in FIG. 10). To avoid such a situation, the controller 6 is configured not to correct the bucket angle in the case where the vehicle body is inclined and the height of the lift arm 23 is equal to or less than the height in the horizontal posture.

In the above, the embodiment of the present invention has been descried. The present invention is not limited to the embodiment described above, and includes various modifications. For example, the embodiment described above has been explained in detail in order to clarify the present invention, but is not necessarily limited to the one having all the configurations described. In addition, a part of the configuration of the present embodiment can be replaced with that of other embodiments, and the configuration of other embodiments can be added to the configuration of the present embodiment. Furthermore, it is possible to add, delete, or replace another configuration with respect to a part of the configuration of the present embodiment.

For example, in the embodiment above, the controller 6 corrects the angle of the bucket 21 in the case where the switch 121 is enabled, the absolute value |θ| of the inclination angle is equal to or more than the inclination angle threshold value θth (|θ|θth), and the lift arm angle α is more than the arm angle threshold value αth (α>αth), however, the present invention is not limited thereto. The controller 6 may be configured, at least when the height position of the bucket 21 reaches the predetermined height or more, correct the angle of the bucket 21 in accordance with the inclination angle θ of the vehicle body.

Furthermore, in the embodiment above, as the bucket angle sensor 31, the one configured to detect the angle of the bucket 21 with respect to the lift arm 23 is used, and the controller 6 is configured to calculate the bucket-to-ground angle γ based on the bucket angle β detected by the bucket angle sensor 31 and the inclination angle θ detected by the inclination sensor 33, however, the present invention is not limited thereto. As the bucket angle sensor 31, the one capable of directly detecting the bucket-to-ground angle γ may be used, and in such a case, the controller 6 may be configured to calculate the correction angle γc based on the bucket-to-ground angle γ detected by the bucket angle sensor 31.

In the embodiment above, the wheel loader 1 has been described as an aspect of work vehicles. However, the present invention is not limited thereto, and may be applied to other work vehicles equipped with the bucket 21.

REFERENCE SIGNS LIST

1: wheel loader (work vehicle)
6: controller
11A: front wheel
11B: rear wheel
21: bucket
22: bucket cylinder
23: lift arm (arm member)
32: arm angle sensor (height sensor)
33: inclination sensor
41: hydraulic pump
42: directional control valve
51: first solenoid proportional valve
52: second solenoid proportional valve
121: switch
122: operation lever (operation device)
θth: inclination angle threshold value (predetermined angle threshold value)

The invention claimed is:

1. A work vehicle comprising:
a vehicle body provided with front wheels and rear wheels;
a work device including an arm member which is mounted to a front portion of the vehicle body so as to rotatably move in an upper and lower direction, and a bucket which is mounted to a distal end portion of the arm member so as to dump and tilt;
a bucket cylinder for driving the bucket;
a hydraulic pump for supplying hydraulic oil to the bucket cylinder;
a directional control valve configured to control a flow of the hydraulic oil discharged from the hydraulic pump and supplied to the bucket cylinder;
a solenoid proportional valve configured to control the directional control valve;
a controller configured to control the solenoid proportional valve; and
an inclination sensor configured to detect an inclination angle of the vehicle body,
wherein the controller is configured to:
in a case where a height position of the bucket is higher than a predetermined height and the vehicle body is in a state of being inclined rearward, correct an angle of the bucket to a front side where the bucket dumps in accordance with the inclination angle of the vehicle body detected by the inclination sensor,
in a case where the height position of the bucket is higher than the predetermined height and the vehicle body is in a state of being inclined forward, correct the angle of the bucket to a rear side where the bucket tilts in accordance with the inclination angle of the vehicle body detected by the inclination sensor,
in a case where the height position of the bucket is equal to or less than the predetermined height, not to correct the angle of the bucket even in both the states where the vehicle body is being inclined rearward and the vehicle body is being inclined forward, and
in a case where an absolute value of the inclination angle of the vehicle body is less than a predetermined inclination angle, not to correct the angle of the bucket.

2. The work vehicle according to claim 1,
wherein the controller is configured to, in a case where an absolute value of the inclination angle of the vehicle body detected by the inclination sensor is equal to or more than a predetermined angle threshold value set based on the inclination angle of the vehicle body in an occurrence of spillage of load materials in the bucket in a state where a height position of the arm member is higher than a height of the arm member in a horizontal posture, correct the angle of the bucket to a front side where the bucket dumps or tilts in accordance with the inclination angle of the vehicle body detected by the inclination sensor.

3. The work vehicle according to claim 2, further comprising a height sensor configured to detect the height of the arm member corresponding to the height position of the bucket,
wherein the controller is configured to, in a case where the height of the arm member detected by the height sensor is higher than the height of the arm member in the horizontal posture, correct the angle of the bucket to the front side where the bucket dumps or tilts in accordance with the inclination angle of the vehicle body detected by the inclination sensor.

4. The work vehicle according to claim 1, further comprising an electric operation device for operating the bucket,
wherein the controller is configured to,
in a case of receiving an operation signal corresponding to an operation amount of the operation device while correcting the angle of the bucket to a front side where the bucket dumps or tilts in accordance with the inclination angle of the vehicle body detected by the inclination sensor, output a command signal based on the operation signal to the solenoid proportional valve.

5. The work vehicle according to claim 1, further comprising a switch for enabling correction processing by the controller,
wherein the controller is configured to, in a case of receiving a valid signal from the switch, correct the angle of the bucket to a front side where the bucket dumps or tilts in accordance with the inclination angle of the vehicle body detected by the inclination sensor.

* * * * *